July 6, 1926.
A. F. CALLISON
COUPLING DEVICE
Filed Dec. 30, 1924 4 Sheets-Sheet 1
1,591,655
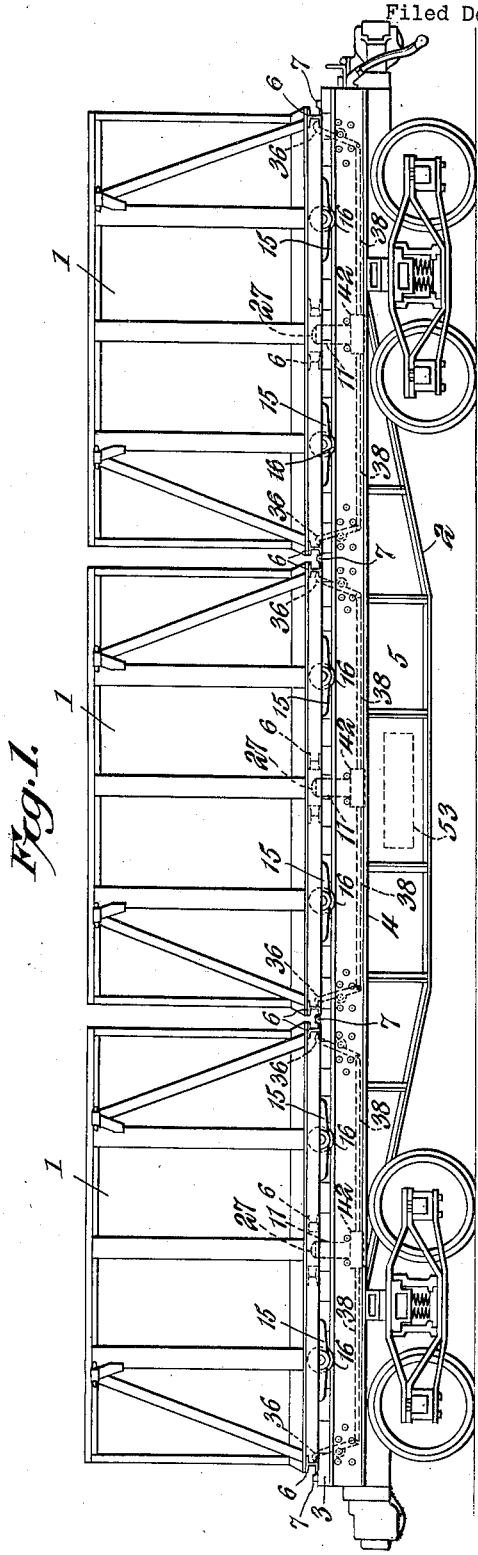
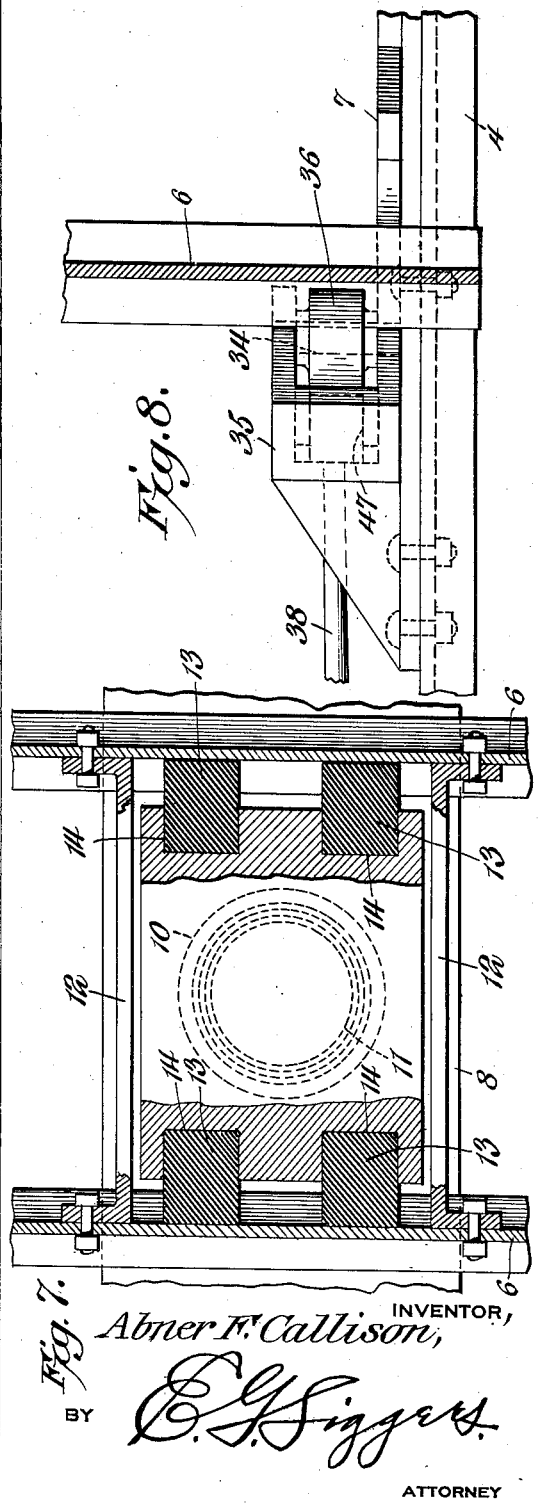
INVENTOR,
Abner F. Callison,
BY
ATTORNEY

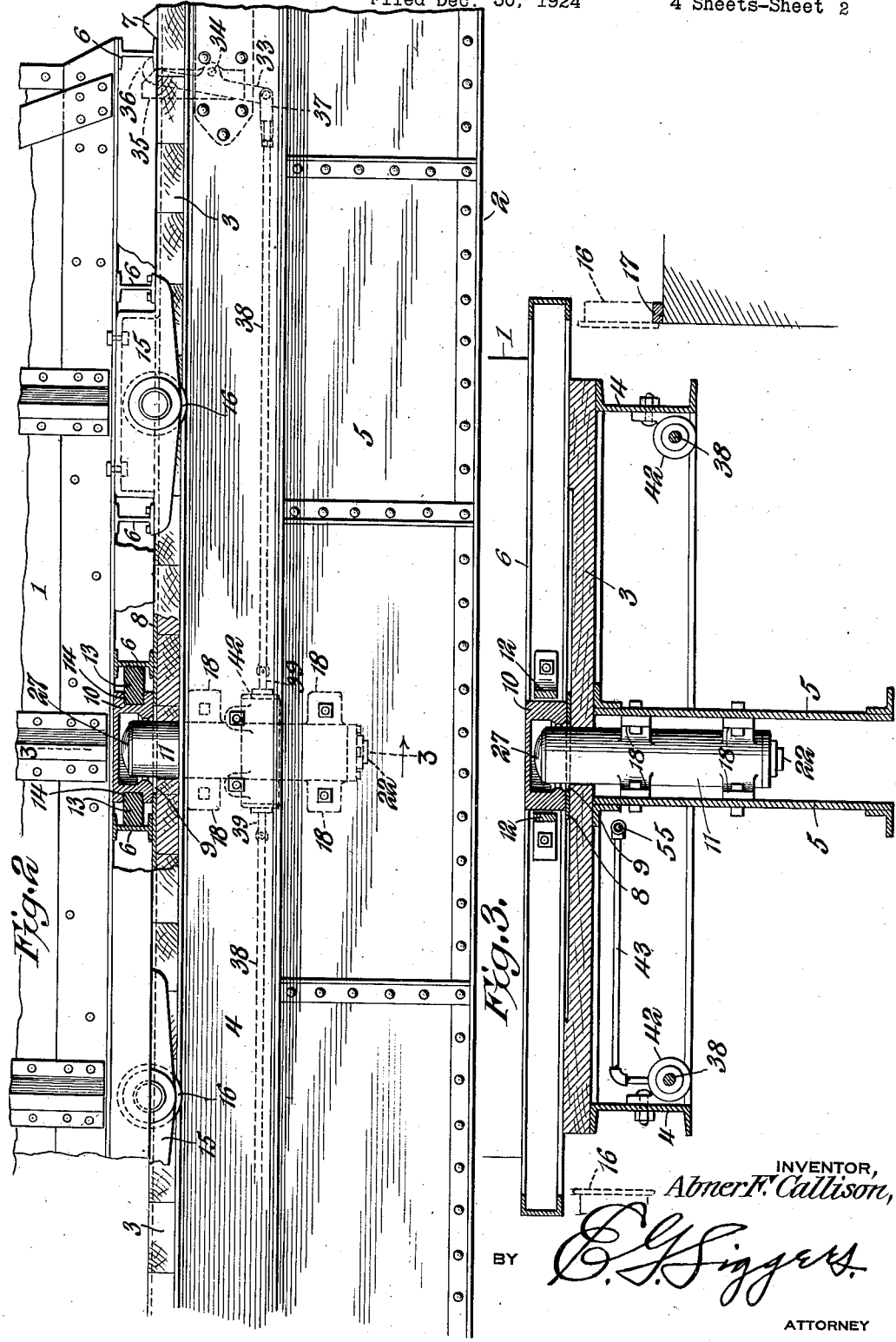

July 6, 1926.
A. F. CALLISON
COUPLING DEVICE
Filed Dec. 30, 1924
1,591,655
4 Sheets-Sheet 3
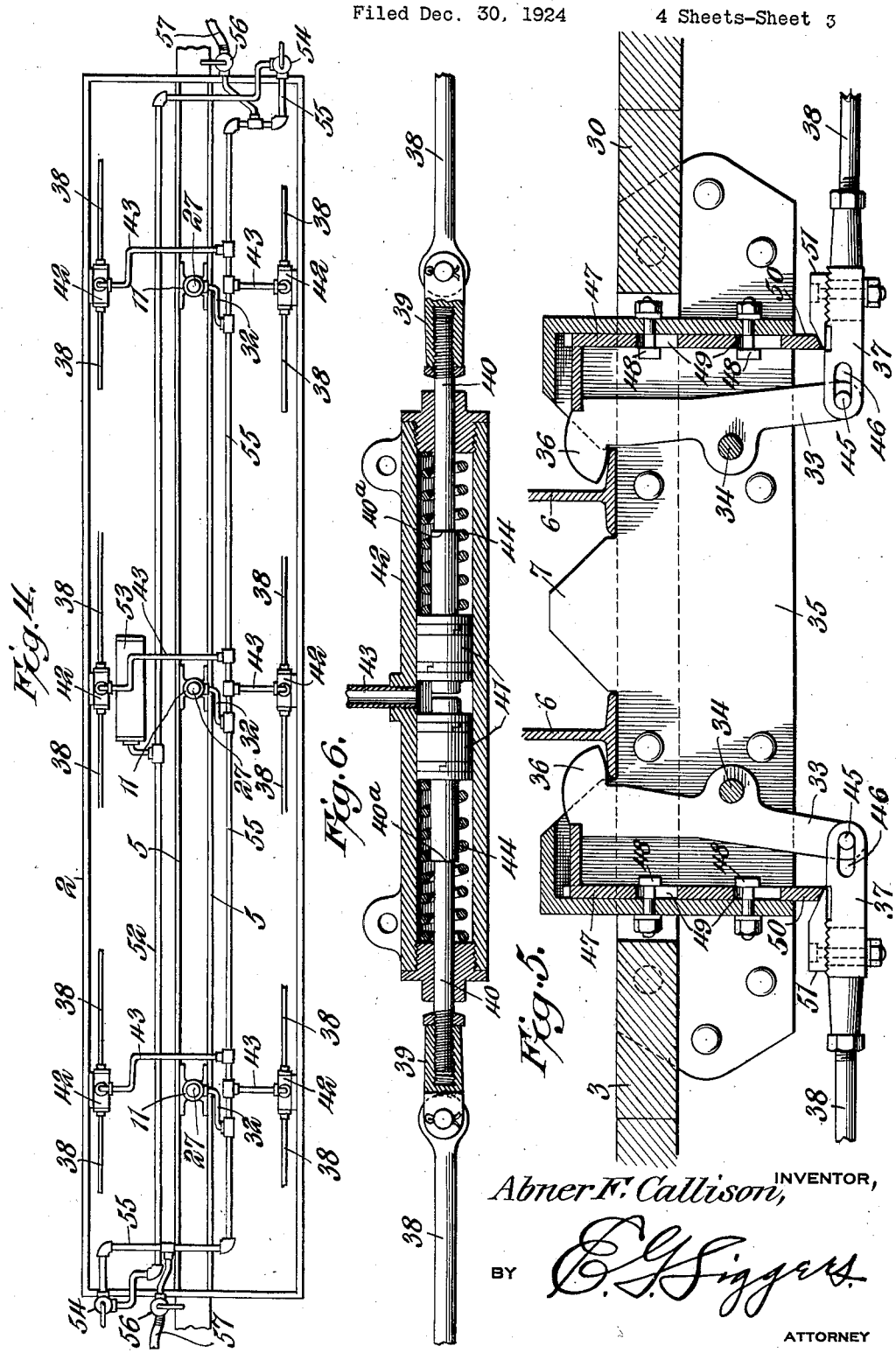
Abner F. Callison, INVENTOR,
BY C. G. Siggers
ATTORNEY

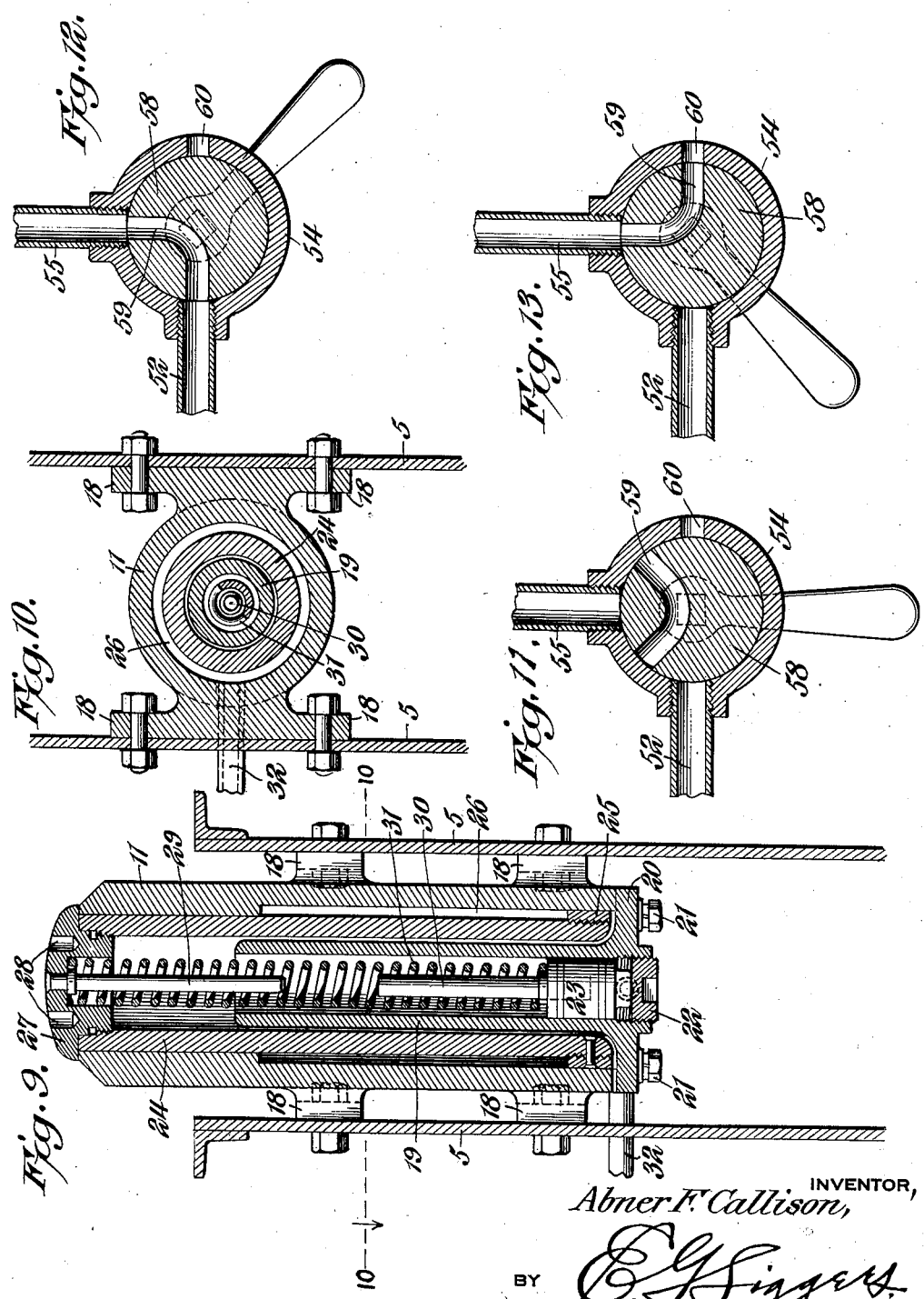

Patented July 6, 1926.

1,591,655

UNITED STATES PATENT OFFICE.

ABNER F. CALLISON, OF NEW YORK, N. Y.

COUPLING DEVICE.

Application filed December 30, 1924. Serial No. 758,851.

This invention relates to a coupling device, especially adapted for use on railroad cars, large motor trucks and the like, for securing thereto large merchandise containers, or similar portable freight units of large size and for facilitating the loading or unloading of the same.

The present invention is in the nature of an improvement over the construction shown in United States Patent No. 1,499,971, granted to me July 1, 1924, and like the device disclosed in said patent, may be used to expedite the transfer of the containers to and from ramp tracks provided for that purpose.

The more important objects of the present invention are to provide improved co-engageable means for establishing the connection between the car and the container, an improved air pressure system for controlling the operation of the same, and in connection therewith, means for positively locking the containers to the car, which means is automatically moved to unlocked position during the loading or unloading operation.

The invention consists further in various details of construction and combinations of elements, the advantages of which will be fully explained in connection with the accompanying drawings, showing one adaptation of the invention.

In the drawings:

Figure 1 is a side elevation of a flat car in connection with which the invention is used.

Figure 2 is an enlarged view of a portion of Figure 1 with a portion broken away in order to better illustrate the coupling means.

Figure 3 is a transverse section taken on the line 3—3 of Figure 2.

Figure 4 is a more or less diagrammatic view illustrating the air pressure system.

Figure 5 is a detail view of the locking means constituting a part of the invention.

Figure 6 is a detail sectional view of the air pressure cylinder and the pistons for actuating the locking means.

Figure 7 is an enlarged detail view of one of the socket members forming a part of the coupling device.

Figure 8 is a plan view of one of the locking members.

Figure 9 is a vertical section through one of the tubular members forming a part of the coupling device.

Figure 10 is a sectional view taken on the line 10—10 of Figure 9.

Figure 11 is a detail view of one of the valves for controlling the air pressure system, the valves being shown in normal or neutral position.

Figure 12 is a similar view showing the valve in position to admit pressure to the system.

Figure 13 is a similar view showing the valve in position to exhaust the pressure system.

The invention is adapted to be used in connection with the handling of merchandise in large portable containers 1, and in its present adaptation is used in connection with a flat car 2 of modern construction. These flat cars, as at present constructed, have a floor or platform 3 supported by a metallic framework 4, with reinforcing plates 5 extending longitudinally near the center line of the car. The containers 1 have a plurality of I beams 6 extending transversely of their bottoms, and the I beams at the ends of the containers are adapted to fit between abutments 7, extending upwardly at the sides of the car. It has been found quite feasible to use containers of such size that three of them form a carload, the containers being arranged end to end and spaced apart sufficiently to permit them to be moved over the inclined portion of the ramp track without interfering with each other.

Each container is provided with a plate 8 extending longitudinally beneath the I beams 6, and formed with one or more circular openings 9 above which a socket member 10 is supported between two of the I beams 6. The opening in this socket member is somewhat greater in diameter than the opening 9, and, when the container is in normal loaded position, is adapted to receive a cast steel tubular housing member 11, which projects upwardly through the floor of the car. The socket member 10 is retained between the plate 8 and the bottom of the container, and is held against lateral movement by strips 12 secured to the I beams, as shown in Figure 7. The front and rear edges of the member 10 are normally held spaced from the I beams by buffers 13, which are mounted between the I beams and recesses 14 formed in the socket members, and which are of elastic material, so as to permit the socket member 10 to yield somewhat when it is engaged by the coupling member during the loading operation until the inertia of the container is overcome, and it begins to move with the car.

Each container is provided at each side with journal boxes 15, in which are mounted small wheels or rollers 16. These rollers are adapted to overhang the sides of the car, and to ride on ramp tracks 17 during the loading or unloading operation, which is carried out in the manner described in the above mentioned patent.

The tubular coupling member 11 is formed with lugs 18, which are securely bolted to the longitudinal plates 5 of the car. A cylinder 19 is located centrally of the tubular member 11, and at its lower end is formed with an annular flange 20, which is secured to the lower end of the member 11 by suitable bolts 21 or the like. A plug 22 is threaded into the lower end of the cylinder 19, and a piston 23 within the cylinder is adapted to be operated by air pressure. A sleeve 24 is slidably mounted in the member 11, and surrounds the cylinder 19. The lower end of the sleeve 24 has a ferrule 25 secured thereto, and the lower portion of the tubular member 11 is reamed out, as at 26, to permit the ferrule to move upwardly a limited distance, but preventing the sleeve 24 from being removed entirely from the member 11. The upper end of the sleeve 24 is closed by a head 27, which is in threaded engagement therewith, and is provided with recesses 28 for receiving a spanner wrench. A stem 29 is secured to the head 27, and extends downwardly within the sleeve 24 toward a smaller stem 30, which extends upwardly from the piston 23. A coiled spring 31 surrounds the stems 29 and 30. The piston 23 may be forced upwardly in the cylinder 19 by means of air pressure introduced through a pipe 32 connected to an air pressure system, which will be hereafter described.

In the form of the invention herein shown, each container is provided with a single socket member 10, located substantially centrally of its bottom, and the car is provided with a tubular coupling member 11 for each of these socket members. The primary purpose of these co-engaging members 10 and 11, the the cooperating plunger head 27 is to expedite the transfer of the containers to and from the ramp tracks 17. Additional means also actuated by the air pressure system are provided for locking the containers to the floor of the car. These means include a plurality of locking dogs 33, preferably four for each container, for engaging the flanges of certain of the I beams 6 near the respective corners of the container. As shown in Figures 5 and 8, each dog 33 is intermediately pivoted on a pin 34 secured in a housing 35 attached to the side of the car, with the adjacent abutment 7 forming an integral part thereof. Each dog is provided with a nose 36 at its upper end adapted to engage over the lower flange of the I beam, and is connected at its lower end to a yoke 37 secured to the end of a rod 38, the other end of the rod having a pivoted head 39, as shown in Figure 6, which is secured to the stem 40 of a piston 41, which operates in a cylinder 42 secured to the side of the car, the stem 40 being formed with a shoulder $40^a$ which limits the outward movement of the piston. Each cylinder 42 has two pistons 41 operating in opposite directions, and the central part of the cylinder is connected by a pipe 43 to the air pressure system.

Normally, when the containers are loaded and the air pressure is released, the pistons 41 are moved toward the center of the cylinder 42 by expansile coiled springs 44 seated between the pistons 41 and the respective ends of the cylinder. The dogs 33 are then in the position shown in Figure 5. The lower ends of the dogs are provided with lugs 45, which extend into slots 46 in the yoke 37, thus providing a lost motion connection between the dogs and the rods 38. Each dog when in locking position is positively held by a gravity latch 47, which is slidably connected with the end of the housing 35 by bolts 48, which pass through slots 49 in the latch. The lower end of the latch projects below the housing 35 as shown at 50, and is provided with a beveled end, which rests upon a wedge member 51 adjustably secured to the yoke 37. When at the beginning of the unloading operation, air pressure is introduced into the system to raise the plunger head 27 against the bottom of the container, the pistons 41 are forced outwardly toward the ends of the cylinder 42. The yokes 37 and wedge members 51 are moved outwardly, and the latches 47 are raised to release the dogs 33, and as the lugs 45 are engaged by the inner ends of the slots 46, the dogs are swung about their pivots to disengage them from the I beams, so that the container may be raised up from the floor of the car when the wheels 16 ride up onto the ramp track 17.

The air pressure system, as shown in Figure 4, includes a pipe 52, extending from end to end of the car, and connected to the tank 53 of the air brake system, which is connected up in the usual manner. The pipe 52 is connected at each end through a valve box 54 to a pipe 55, which extends longitudinally of the car, and is connected by branches 32 and 43 to the cylinders 19 and 42, respectively. The pipe 52 is also connected at each end of the car with a cut-off valve 56 from which leads a hose 57, adapted to be coupled to a corresponding hose on the end of the next car, so that the pipes 52 of all of the cars in the train may be connected into one system.

Each valve box 54 contains a valve 58 having an angular passageway 59 therethrough. All of the valves 58 are normally left in a neutral position, as shown in Figure 11, so that the pipe 55 will be connected neither to the pressure pipe 52 nor to the exhaust port 60, which is located on the opposite side of the valve box. When all of the valves are left in this normal or neutral position, any one of the valves 58 may be independently moved to the position shown in Figure 12, to connect the pipe 55 with the pressure pipe 52 leading from the air brake tank, and may be subsequently moved to the position shown in Figure 13, to shut off the pressure and to release the compressed air through the exhaust port 60. With the valves 56 closed at each end of the car, the pressure system on that car may be controlled independently of the other cars. If desired, however, any number of cars may be connected into one system by opening the valves 56 between the several cars, and the entire system, including all of the pipes 52, may be controlled by either one of the valves 58 on any of the cars in the system.

In unloading the containers onto a ramp track, the pressure systems on all of the cars to be unloaded will usually be connected into one system. As the first car approaches the incline of the ramp track, the brakeman turns one of the valves 58 to the position shown in Figure 12, thus introducing compressed air into the pressure system. It is assumed that all of the other valves 58 are in neutral position, as shown in Figure 11. Pressure will then enter through the pipes 43 into the cylinders 42, forcing the pistons 41 outwardly, and unlocking all of the dogs 33. Pressure will also be introduced under each of the pistons 23, forcing the same upwardly, compressing the spring 31, and forcing the plunger head 27 against the bottom of the respective container. As each container is moved up the ramp track, the corresponding plunger head 27, under the pressure of the spring 31, will follow the bottom of the container, and acting against the side of the socket member 10 will advance the container as the latter moves along on the ramp track. When the containers have been moved to the position in which they are to be left, the valve 58, which is now in the position shown in Figure 12, is moved to the position shown in Figure 13, shutting off the system from the pressure pipe 52, and opening the same to relieve the pressure through the exhaust port 60. The piston 23 and the plunger head 27 will now drop, and since the containers, which are being unloaded, are now supported on the ramp tracks, they are elevated sufficiently to permit the coupling members 11 to ride beneath the same as the cars are drawn from beneath the containers.

In loading the containers onto the cars, if they are bunched in groups of three, in the same relative position in which they were left unloaded, they may all be loaded onto the cars at one time. In the loading operation, the process is, of course, reversed. The cars are backed beneath the containers, and as the coupling members 11 approach the socket members in the respective containers, the air pressure is turned on, and the plunger heads 27 are forced upwardly against the bottom plates 8, and ride along the underside of the same until they reach the socket members 10 into which they are projected. The bufferes 13 serve as cushions to take up the shock, while the motion of the freight car is overcoming the inertia of the container. After the socket members 10 in all of the containers have been engaged by the respective plunger heads 27, the train may be moved ahead until the containers are moved from the ramp track and rest on the bottom of the car. The beveled sides of the abutments 7, as well as the sides of the socket members 10, insure the accurate positioning of the containers on the car. The air pressure is now released permitting the springs 44 to act and to cause the dogs 33 to positively lock the containers to the floors of the cars.

In carrying out the loading operation, if the several containers are scattered along the ramp tracks at irregular intervals, the system may be operated so that the first plunger will engage the socket member of the first container, and the latter may be moved along the ramp track until three containers are bunched together. They may then be loaded in the usual manner, and any number of cars may be loaded in this way.

While I have illustrated and described the invention in connection with a flat car, it will be apparent that the same may be used in connection with motor trucks and other types of carriers, and that many modifications may be made in the details of the various parts, and in their structural relation to each other, without any material departure from the essential principles of the invention. It is, therefore, desired to include all such modifications within the scope of the appended claims.

What is claimed is:

1. In a device of the character described, the combination of a platform having a relatively fixed upstanding projection, a container adapted to rest on the platform and having a socket in its bottom for receiving said projection, a member normally housed within said projection and projectible vertically upwardly to maintain the connection between the platform and container after the latter is raised so that its bottom is above the upper end of said projection.

2. In a device of the character described, the combination of a platform having a relatively fixed upstanding projection, a container adapted to rest on the platform and having a socket in its bottom for receiving said projection, a member normally housed within said projection, and pneumatically operated means for projecting said member upwardly above said upstanding projection to maintain the connection between the platform and the container after the latter is raised so that its bottom is above the upper end of said projection.

3. In a device of the character described, the combination of a platform having an upstanding projection, a container adapted to rest on the platform and having a socket member in its bottom for receiving said projection, pivoted dogs engageable with the container to lock the same to the platform, and a member projectible upwardly above said upstanding projection to maintain the connection between the platform and container when the latter is released by the dogs and raised from the platform.

4. In a device of the character described, the combination of a platform having an upstanding projection, a container adapted to rest on the platform and having a socket member in its bottom for receiving said projection, dogs pivotally connected to the platform and engageable with the container to lock the same to the platform, yieldable means urging the dogs toward engaging position, a member projectible above the upstanding projection to maintain engagement with the socket member when the container is raised from the platform, and means for simultaneously actuating said projectible member and moving said dogs to release position in opposition to said yieldable means.

5. In a device of the character described, the combination of a platform having an upstanding tubular projection, a container adapted to rest on the platform and having socket member in its bottom for receiving said projection, pivoted dogs extending upwardly above the platform and engageable with the container to lock the same to the platform, springs urging the dogs toward engaging position, a member normally housed within said tubular member and projectible above the same to maintain engagement with said socket member when the container is raised, and a pneumatic system supported by said platform and operable to simultaneously actuate said projectible member and move said dogs to release position in opposition to said springs.

6. In a device of the character described, the combination of a platform having an upstanding projection, a container having a socket member in its bottom for receiving said projection, said socket member having a limited horizontal movement longitudinally of the container, and yieldable buffers normally holding said socket member in a central position.

7. In a device of the character described, the combination of a platform having an upstanding tubular member, a container adapted to rest on the platform and having a socket member in its bottom for receiving said projection, a member housed within the tubular member and projectible upwardly above the same to maintain the connection between the platform and container when the latter is raised, said socket member having a limited horizontal movement longitudinally of the container, and yieldable buffers normally holding said socket member in a central position.

8. In a device of the character described, the combination of a platform having an upstanding tubular member, a container adapted to rest on the platform and having a socket member in its bottom for receiving said projection, pivoted dogs projecting upwardly from the platform and engageable with the container to lock the same to the platform, a member normally housed within said tubular member and projectible upwardly above the same to maintain the connection between the platform and container when the latter is released by the dogs and raised from the platform, said socket member having a limited movement longitudinally of the container, and yieldable buffers normally holding said socket member in a central position.

9. In a device of the character described, the combination of a platform having a tubular housing projecting vertically above its surface, a sleeve mounted for vertical reciprocation within the housing, a head secured to the upper end of the sleeve and having a stem projecting downwardly from its center, a cylinder mounted within the sleeve and secured in fixed relation to the housing, a piston head operable in the cylinder and having a stem projecting upwardly toward said downwardly projecting stem, a coiled spring surrounding the stems and engaging the two heads, means for introducing fluid pressure underneath the piston to raise the same and project the sleeve above the tubular housing, the lower portion of the tubular housing being reamed out, and a ferrule secured to the lower end of the sleeve in the reamed out portion of the tubular housing to positively limit the upward movement of the sleeve.

10. In a device of the character described, the combination with a railroad flat car equipped with an air brake system and having two spaced longitudinally extending reinforcing plates underneath the platform, of a tubular housing located between said plates and having lugs formed thereon which are secured to the plates, said housing extending upwardly through the platform and above the same, a sleeve reciprocably mounted within the housing, a head secured to the upper end of the sleeve and having a stem projecting downwardly from its center, a cylinder mounted within the sleeve and secured in fixed relation to the housing, a piston head operable in the cylinder and having a stem projectng upwardly toward said downwardly projecting stem, a coiled spring surrounding the stem and engaging the two heads, and means for introducing air pressure from said air brake system underneath the piston to raise the same and to project said sleeve above the tubular housing.

11. In a device of the character described, the combination with a container having I beams secured transversely of its bottom near opposite ends thereof, of a platform having opposed abutments adapted to receive the I beams between them to position said container, dogs pivoted to and extending upwardly above the platform, and means for rocking all of said dogs simultaneously about their pivots into engagement with the opposed lower flanges of the respective I beams to lock the container to the platform.

12. In a device of the character described, the combination with a railroad flat car having an air brake system, of a container having I beams secured transversely of its bottom near opposite ends thereof, said car having opposed abutments adapted to receive the I beams between them to position the container on the platform, dogs pivoted to and extending upwardly above the platform, and pneumatic means connected with the air brake system and operable to actuate all of said dogs simultaneously to swing them about their pivots into engagement with the opposed lower flanges of the respective I beams to lock the container to the platform.

13. In a device of the character described, the combination of a platform, a portable container, means for positioning the container on said platform, dogs pivotally connected with the platform and movable about their pivots to engage and lock the container to the platform, gravity latches for positively holding the respective dogs in locking position, an operating member for each dog having a lost motion connection therewith, means on said operating member for lifting the latch during the lost motion incident to the release of the dog, and means for actuating all of said operating members simultaneously.

14. In a device of the character described, the combination of a platform, a portable container, means for positioning the container on said platform, a tubular member extending upwardly above the platform, a socket member in the bottom of the container for receiving said projection, a member housed within said tubular member and projectible upwardly above the same to maintain the connection between the platform and container when the latter is raised from the platform, dogs pivotally connected with the platform and movable about their pivots to engage and lock the container to the platform, gravity latches for positively holding the respective dogs in locking position, an operating member for each dog having a lost motion connection therewith, means on said operating member for lifting the latch during the lost motion incident to the release of the dog, and means for simultaneously actuating all of said operating members and lifting said projectible member.

15. The combination with a railroad flat car equipped with an air brake system, of a plurality of containers adapted to rest on the car platform and each having a socket member in its bottom, projections upstanding from the car platform and adapted to project into said socket members, pivoted dogs engageable with each container to lock it to the platform, a member adapted to project upwardly from each upstanding projection to maintain the connection between the platform and the respective containers when the latter are released by the dogs and raised from the platform, a pneumatic system connected with the air brake system and operable to release said dogs and at the same time to raise said projectible members, and means for connecting the pneumatic system to a similar pneumatic system on adjacent cars so that all may be operated simultaneously.

In testimony that I claim the foregoing as my own, I have hereto affixed my signature.

ABNER F. CALLISON.